(No Model.)
E. W. BALDING.
PNEUMATIC TIRE.
No. 579,122. Patented Mar. 23, 1897.
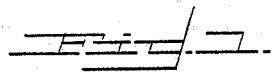
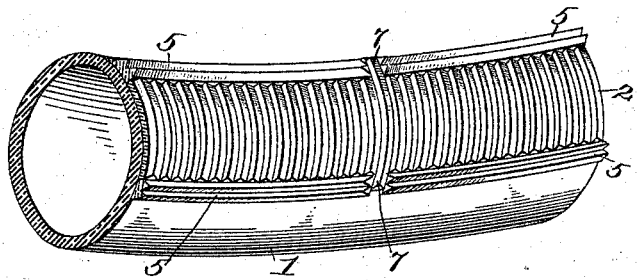
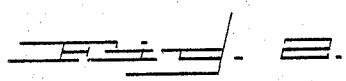
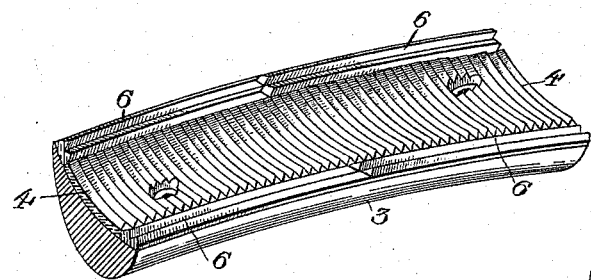
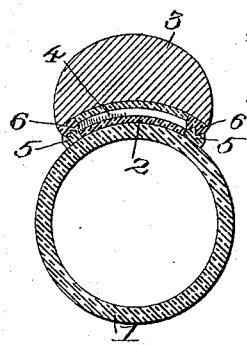
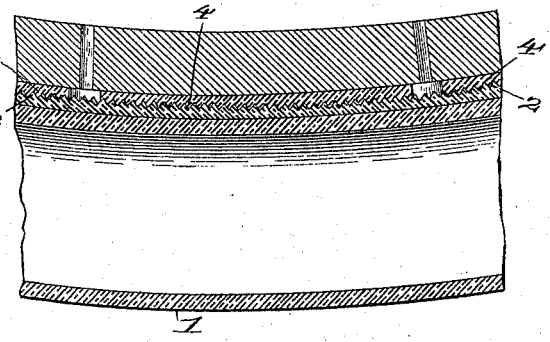
Witnesses
T. Lloyd McKabee
R. M. Smith
Inventor
Edgar W. Balding,
By his Attorneys,
C. A. Snow & Co.
THE NORRIS PETERS CO., PHOTO-LITHO., WASHINGTON, D. C.

UNITED STATES PATENT OFFICE.

EDGAR W. BALDING, OF NEWARK, NEW JERSEY.

PNEUMATIC TIRE.

SPECIFICATION forming part of Letters Patent No. 579,122, dated March 23, 1897.

Application filed March 17, 1896. Serial No. 583,574. (No model.)

*To all whom it may concern:*

Be it known that I, EDGAR W. BALDING, a citizen of the United States, residing at Newark, in the county of Essex and State of New Jersey, have invented a new and useful Pneumatic Tire, of which the following is a specification.

This invention relates to pneumatic tires and has special reference to the means for securing the tire in the rim without the aid of cement and also without resorting to the clencher or locking-band principles.

The object of the present invention is to provide fastening means by which a single or double tube tire may be secured in the rim so that it will be prevented from creeping longitudinally or rolling transversely, the tire being readily removable upon deflation and being firmly held in place when inflated.

To this end the invention consists in an improved fastening for pneumatic tires embodying certain novel features and details of construction, as hereinafter fully described, illustrated, and claimed.

In the accompanying drawings, Figure 1 is a reverse perspective view of a portion of a tire constructed in accordance with the present invention. Fig. 2 is a detail perspective view of a section of the rim adapted to receive and engage the tire. Fig. 3 is a cross-section through the rim and tire. Fig. 4 is a longitudinal section through short sections of the rim and tire.

Similar numerals of reference designate corresponding parts in the several figures of the drawings.

Since the discovery of means and appliances whereby a single or double tube tire may be quickly and easily patched when punctured, the demand for clencher-tires is decreasing, as it is more desirable to have a single-tube tire on account of its attendant lightness and increased resiliency. At the same time it is important to make the tire readily detachable from the rim, so as to facilitate the repairing of the same and to enable the tire to be submerged in water for the purpose of finding the puncture without the attendant disadvantage of having to submerge the rim and spokes of the wheel, which would thereupon take up the water and eventually wet the greater portion of the wheel, to the injury of the bearings, &c. In order to overcome these difficulties and provide a simple and yet thoroughly effective engagement between the tire and rim which will enable the tire to be instantly removed upon deflation, I have devised the following means:

The tire (indicated at 1) is of what is known as the "hose-pipe" or "single-tube" form and may be of any usual or preferred construction as regards the material of which it is composed. For the purpose of carrying out the present invention the rim-surface of the tire is provided with a circumferential series of transverse ribs or corrugations 2, of a length somewhat less than the width of the rim, (indicated at 3.)

The rim 3 is provided in its outer concaved surface with a corresponding series of transverse ribs or corrugations 4, which are adapted to meet and receive the ribs or corrugations of the tire in interlocking engagement, as shown in the longitudinal section. Upon each side of the transverse corrugations 2 the tire is provided with longitudinal or circumferential ribs or corrugations 5, which interlock with corresponding longitudinal or circumferential ribs or corrugations 6, located at the edges of the rim 3 and at each side of its transverse corrugations 4.

In some cases it is desirable to extend certain of the transverse ribs or corrugations 2 of the tire laterally beyond the rest, so that the ends of said rib or corrugation will reach to the extreme edges of the rim. In this event the longitudinal corrugations 5 of the tire are intercepted by or terminate at or in proximity to such transversely-extended rib, as indicated at 7. These extended ribs are located at regular intervals throughout the tire, and the longitudinal ribs of the rim are notched at corresponding points to receive such extended ribs. The object of this last-named provision is to enable the person applying the tire to the rim to bring the tire and rim into the proper relation to each other.

The transverse ribs of the tire and rim, by their interlocking engagement, positively prevent the longitudinal or circumferential creeping of the tire when the latter is inflated, and the longitudinal or circumferential ribs or corrugations of the tire and rim, by their interlocking engagement, effectively guard against the lateral wabbling of the tire and prevent the same from rolling out of the rim or turning and twisting therein. It is not essential to employ the laterally-extended ribs or corrugations at intervals throughout the tire, as above described, as the valve-stem will ordinarily enable the person applying the tire to seat the tire in the rim properly, and such provision may therefore be dispensed with, if desired. When inflated, the tire is pressed firmly against the rim and interlocked therewith, as stated, preventing the creeping of the tire and the consequent cutting off of the valve-stem. By deflating the tire it may be readily rolled out of the rim, repaired, and replaced at pleasure. It will be apparent that the several ribs or corrugations of the tire may be either formed integrally therewith or applied thereto in any manner, and likewise the ribs or corrugations of the rim may be formed integrally therewith from the material of the rim itself, or they may be formed separately in sections or continuous strips and applied to the rim by cementation or otherwise. When formed separately from the rim, they are preferably constructed of rubber or equivalent material, whereby the longitudinal ribs or corrugations extending along the edges of the rim will serve as cushions for the tire and prevent the rim from cutting into and injuring the tire in the event of the tire being punctured and deflated without being noticed by the rider. It will also be apparent that changes in the form, proportion, and minor details of construction may be resorted to without departing from the spirit or sacrificing any of the advantages of this invention.

Having thus described the invention, what is claimed as new is—

1. In combination with a pneumatic tire, a rim, and interlocking transverse corrugations on each bounded upon each side with longitudinal corrugations, certain of the transverse corrugations at suitable intervals being of greater length than the others and extended across the planes of the longitudinal corrugations, substantially as and for the purpose described.

2. A pneumatic tire provided on its rim-surface with transverse corrugations of different lengths, and longitudinal corrugations bounding the transverse corrugations at each side and interrupted at intervals by the longer transverse corrugations which intersect therewith or across the plane of the longitudinal corrugations, substantially as and for the purpose described.

3. The combination with a rim, and a pneumatic tire, of interlocking longitudinal corrugations on said rim and tire, the said corrugations being spaced apart transversely and arranged at or near the edges of the rim and extending entirely around the rim and tire, and cross-corrugations extending transversely of the rim and tire and filling the space between the spaced longitudinal corrugations, substantially as described.

In testimony that I claim the foregoing as my own I have hereto affixed my signature in the presence of two witnesses.

EDGAR W. BALDING.

Witnesses:
GEORGE A. SMITH,
JOHN F. CROWLEY.